US012722180B2

(12) United States Patent
Nishio

(10) Patent No.: US 12,722,180 B2
(45) Date of Patent: Sep. 1, 2026

(54) COATING DEVICE

(71) Applicant: CHUGAI RO CO., LTD., Osaka (JP)

(72) Inventor: Tsutomu Nishio, Osaka (JP)

(73) Assignee: CHUGAI RO CO., LTD., Osaka (JP)

( * ) Notice: Subject to any disclaimer, the term of this patent is extended or adjusted under 35 U.S.C. 154(b) by 608 days.

(21) Appl. No.: 18/041,615

(22) PCT Filed: Aug. 20, 2021

(86) PCT No.: PCT/JP2021/030526

§ 371 (c)(1), (2) Date: Feb. 14, 2023

(87) PCT Pub. No.: WO2022/050077

PCT Pub. Date: Mar. 10, 2022

(65) Prior Publication Data

US 2024/0001396 A1 Jan. 4, 2024

(30) Foreign Application Priority Data

Sep. 7, 2020 (JP) ................................ 2020-149543

(51) Int. Cl.

| | |
|---|---|
| ***B05C 5/02*** | (2006.01) |
| ***B05B 1/04*** | (2006.01) |
| ***B05C 11/10*** | (2006.01) |

(52) U.S. Cl.

CPC ........... *B05C 5/0258* (2013.01); *B05B 1/044* (2013.01); *B05C 11/1047* (2013.01)

(58) Field of Classification Search

USPC ................................ 118/300, 692, 684, 410

See application file for complete search history.

(56) References Cited

U.S. PATENT DOCUMENTS

| | | | |
|---|---|---|---|
| 6,715,506 | B1 | 4/2004 | Ikushima |
| 2015/0059644 | A1 | 3/2015 | Watanabe |
| 2015/0128858 | A1 | 5/2015 | Mimura |

FOREIGN PATENT DOCUMENTS

| | | |
|---|---|---|
| CN | 109574511 | 4/2019 |
| CN | 113117970 | 7/2021 |

(Continued)

OTHER PUBLICATIONS

English Translation JP-2007066744A (Year: 2007).*

(Continued)

*Primary Examiner* — Yewebdar T Tadesse

(74) *Attorney, Agent, or Firm* — Muncy, Geissler, Olds & Lowe, P.C.

(57) ABSTRACT

In a coating device wherein a relative movement between an application nozzle located above a coated object W and the coated object is effected to apply a coating liquid P in a coating liquid reservoir of the application nozzle onto a surface of the coated object via a slit-shaped discharge port, the coating device includes: a shutter member rotatable in the coating liquid reservoir to open or close space between the coating liquid reservoir and the slit-shaped discharge port; and a gas feed regulation means for regulating the pressure on the coating liquid in the coating liquid reservoir, and is characterized in that in a state where the gas feed regulation means maintains the pressure on the coating liquid in the coating liquid reservoir to be at a given level, the shutter member is rotated to open or close space between the coating liquid reservoir and the slit-shaped discharge port.

1 Claim, 8 Drawing Sheets

(56) References Cited

FOREIGN PATENT DOCUMENTS

| | | | | |
|---|---|---|---|---|
| JP | H06-226181 | A | | 8/1994 |
| JP | H10-192762 | A | | 7/1998 |
| JP | 2000-280454 | A | | 10/2000 |
| JP | 2002-355592 | | | 12/2002 |
| JP | 2007-066744 | A | | 3/2007 |
| JP | 4344381 | B2 | | 10/2009 |
| JP | 2010266670 | A | * | 11/2010 |
| JP | 2014-022545 | A | | 2/2014 |
| JP | 6195806 | B | | 9/2017 |
| WO | 2015/001925 | | | 1/2015 |

OTHER PUBLICATIONS

International Preliminary Report on Patentability of the corresponding International application No. PCT/JP2021/030526 issued Mar. 7, 2023, which includes Written opinion of the International Searching Authority of PCT/JP2021/030526 mailed Sep. 29, 2021.

The extended European Search Report dated Oct. 10, 2024 issued in the corresponding European Patent Application No. 21864135.5.

* cited by examiner

COATING DEVICE

TECHNICAL FIELD

The present invention relates to a coating device wherein a coating liquid is fed from a coating liquid feed device into a coating liquid reservoir of an application nozzle via a coating liquid feed pipe, a slit-shaped discharge port at a distal end of the application nozzle for discharging the coating liquid from the coating liquid reservoir is located at place above a coated object, and a relative movement between the coated object and the application nozzle is effected so as to allow the coating liquid in the coating liquid reservoir to be applied onto a surface of the coated object via the slit-shaped discharge port. More particularly, the invention is characterized in that when the coating liquid is applied onto the surface of the coated object via the slit-shaped discharge port at the distal end of the application nozzle while effecting the relative movement between the coated object and the application nozzle, coating application can be quickly started or stopped and the coating liquid can be easily applied onto the surface of the coated object in a uniform thickness without producing coat thickness variations on the surface of the coated object.

BACKGROUND ART

It has been a conventional practice to use a coating device for applying the coating liquid onto the surface of the coated object. As disclosed in Patent Document 1, a coating device operates as follows. While the coating liquid is fed from the coating liquid feed device to the application nozzle via the coating liquid feed pipe, the application nozzle is located at place above the coated object in a manner to direct the slit-shaped discharge port at the distal end of the application nozzle to the coated object. The coating liquid is fed from the coating liquid feed device to the application nozzle via the coating liquid feed pipe under a predetermined pressure. While discharging the coating liquid from the slit-shaped discharge port onto the surface of the coated object, the application nozzle is moved over the coated object in a coating direction to apply the coating liquid onto the surface of the coated object. Such a coating device has been used widely.

Unfortunately, the following problems are encountered when the coating liquid is fed from the coating liquid feed device to the application nozzle under the predetermined pressure and discharged from the slit-shaped discharge port onto the surface of the coated object as described above. Because of piping pressure loss (pressure loss) and the like, a predetermined amount of coating liquid cannot be quickly discharged from the slit-shaped discharge port onto the surface of the coated object when the coating liquid is fed from the coating liquid feed device into a coating liquid reservoir via the coating liquid feed pipe. Hence, a coat thickness of the coating liquid applied onto the surface of the coated object is increased little by little from the start of coating application. As a result, a predetermined length of time is required before the coat thickness of the coating liquid applied to the surface of the coated object is gradually increased to reach a given value. When, in order to stop the application of the coating liquid onto the surface of the coated object, the pressure on the coating liquid fed from the coating liquid feed device to the application nozzle is decreased so as to disable the discharge of the coating liquid from the application nozzle, it takes some time before the application nozzle stops discharging the coating liquid. Therefore, the coat thickness of the coating liquid applied onto the surface of the coated object is gradually decreased. At the start or end of coating application, therefore, it is impossible to apply the coating liquid on the surface of the coated object in uniform coat thickness.

According to the above-described coating device, a speed at which the application nozzle is moved over the coated object in an application direction must be delicately regulated at the start or the end of coating application in order to apply the coating liquid onto the surface of the coated object in a uniform coat thickness. It is extremely difficult to apply the coating liquid onto the surface of the coated object in a uniform coat thickness.

As disclosed in Patent Document 2, a shutter member for opening or closing the above-described slit-shaped discharge port as moved by a cylinder is conventionally presented to be disposed under the slit-shaped discharge port at the distal end of the application nozzle. The slit-shaped discharge port is closed by the shutter member so as to prevent the vaporization of a volatile solvent during a coating operation.

According to the coating device where the shutter member is disposed at place under the slit-shaped discharge port and is horizontally moved by the cylinder so as to close the slit-shaped discharge port, the following problem exists. In a case where the coating liquid is fed to the application nozzle under a predetermined pressure and discharged from the slit-shaped discharge port onto the surface of the coated object, a great pressure is applied to the shutter member disposed under the slit-shaped discharge port so that the plate-like shutter member and the cylinder rod are bent under the pressure of the coating liquid. The coating liquid in the application nozzle leaks through gap between the slit-shaped discharge port and the shutter member.

CITATION LIST

Patent Documents

Patent Document 1: JPA No. 4344381
Patent Document 2: JPA No. 2000-280454

DISCLOSURE OF INVENTION

Technical Problem

An object of the invention is to solve the above-described problems encountered by the coating device which performs steps of feeding the coating liquid from the coating liquid feed device into the coating liquid reservoir in the application nozzle via the coating liquid feed pipe; locating the slit-shaped discharge port at place above a coated object, the slit-shaped discharge port disposed at a distal end of an application nozzle for discharging the coating liquid from the coating liquid reservoir; effecting the relative movement between the coated object and the application nozzle; and applying the coating liquid from the coating liquid reservoir onto the surface of the coated object via the slit-shaped discharge port.

In other words, it is an object of the invention to provide quick start and stop of the coating operation as well as an easy coating operation where the coating liquid is applied onto the surface of the coated object in a uniform coat thickness without coat thickness variations when the relative movement between the coated object and the application nozzle is effected so as to apply the coating liquid onto the surface of the coated object via the slit-shaped discharge port disposed in the application nozzle as described above.

Solution to Problem

According to an aspect of the invention for solving the above-described problems, a coating device which feeds a coating liquid from a coating liquid feed device into a coating liquid reservoir in an application nozzle via a coating liquid feed pipe; and which locates a slit-shaped discharge port at place above a coated object, the slit-shaped discharge port disposed at a distal end of the application nozzle for discharging the coating liquid from the coating liquid reservoir; and which applies the coating liquid in the coating liquid reservoir onto a surface of the coated object through the slit-shaped discharge port while effecting a relative movement between the coated object and the application nozzle,

- the coating device further comprising a shutter member which is rotatable in the coating liquid reservoir to open or close space between the coating liquid reservoir and the slit-shaped discharge port, wherein
- the shutter member is rotated to open or close the space between the coating liquid reservoir and the slit-shaped discharge port.

By virtue of the shutter member disposed in the coating liquid reservoir of the application nozzle, despite the great pressure on the coating liquid, the shutter member is not bent so that the leakage of the coating liquid does not occur, unlike the applicator of the Patent Document 2. Furthermore, the wide-width slit-shaped discharge port can be wholly opened or closed in a fraction of a second concurrently when the shutter member is simply rotated a little in the coating liquid reservoir.

Since the wide-width slit-shaped discharge port can be wholly opened or closed in a moment by slightly rotating the shutter member in the coating liquid reservoir, the coating application can be quickly started or ended. Thus, is eliminated the problem of the prior art technique where the coat thickness of the coating liquid applied onto the surface of the coated object is gradually increased to a given value over a long time. When the coating application is stopped, the coat thickness is gradually decreased so that it takes a long time before the discharge of the coating liquid ends.

According to another aspect of the invention, the coating device further includes: a shutter member which is rotated in the coating liquid reservoir to open or close space between the coating liquid reservoir and the slit-shaped discharge port; and a pressure regulation means for regulating the pressure on the coating liquid in the coating liquid reservoir. If the shutter member is rotated to open or close the space between the coating liquid reservoir and the slit-shaped discharge port with the pressure on the coating liquid in the coating liquid reservoir maintained to be at the given level by the pressure regulation means, the following advantages are obtained. In a case where the shutter member is rotated to open the space between the coating liquid reservoir and the slit-shaped discharge port, the coating liquid stored in the coating liquid reservoir is fed, under a given pressure, onto the surface of the coated object through the slit-shaped discharge port so that the coating liquid is applied onto the surface of the relatively moved coated object in a given coat thickness. In a case where the shutter member is rotated to close the space between the coating liquid reservoir and the slit shaped discharge port, the coating liquid feeding onto the surface of the coated object through the slit-shaped discharge port is quickly stopped with the pressure on the coating liquid in the coating liquid reservoir maintained at the given level.

According to another aspect of the invention, the coating device further includes a gas feed regulation means as the above-described pressure regulation means. With the coating liquid fed into the coating liquid reservoir, the gas feed regulation means feeds the gas into the coating liquid reservoir so as to control the pressure on the coating liquid in the coating liquid reservoir to be at the given level. Otherwise, a coating liquid feed regulation means can be provided as the pressure regulation means. When the coating liquid is fed from the coating liquid feed device into the coating liquid reservoir through the coating liquid feed pipe and filled therein, the coating liquid feed regulation means regulates the feeding of the coating liquid so as to control the pressure on the coating liquid stored in the coating liquid reservoir to be at the given level.

In a case where the gas feed regulation means is provided as the pressure regulation means to control the pressure on the coating liquid in the coating liquid reservoir to be at the given level by feeding the gas into the coating liquid reservoir fed with the coating liquid, it is easy to control the pressure on the coating liquid in the coating liquid reservoir to be at the given level. What is more, if air bubbles should be fed into the coating liquid reservoir along with the coating liquid when the coating liquid is fed from the coating liquid feed device into the coating liquid reservoir via the coating liquid feed pipe, the air bubbles in the coating liquid reservoir rise up to the liquid surface so as to be separated from the coating liquid and to be combined with the gas fed into the coating liquid reservoir. This prevents the air bubbles from being fed onto the surface of the coated object via the slit-shaped discharge port.

The coating device according to the invention further includes a bar-shaped body, as the shutter member, which is rotated in the coating liquid reservoir and an outer periphery of which is formed with a guide notch axially extended longer than the slit-shaped discharge port. The shutter member is rotated to bring the guide notch to a position of the slit-shaped discharge port so as to bring the coating liquid reservoir into communication with the slit-shaped discharge port. Thus, the coating liquid in the coating liquid reservoir can be applied onto the surface of the coated object via route from the guide notch to the slit-shaped discharge port.

This configuration permits the discharge of the coating liquid to be quickly started or stopped in unison with respect to the width direction of the slit-shaped discharge port.

Advantageous Effects of Invention

The coating device according to the invention includes: the shutter member rotated in the coating liquid reservoir to open or close the space between the coating liquid reservoir and the slit-shaped discharge port; and the pressure regulation means for regulating the pressure on the coating liquid in the coating liquid reservoir, and has a configuration wherein with the pressure on the coating liquid stored in the coating liquid reservoir maintained to be at the given level by the pressure regulation means, the shutter member is rotated to open or close the space between the coating liquid reservoir and the slit-shaped discharge port. Hence, in a case where the shutter member is rotated to open the space between the coating liquid reservoir and the slit-shaped discharge port, the coating liquid stored in the coating liquid reservoir is quickly fed onto the surface of the coated object through the slit-shaped discharge port under the given pressure. Thus, the coating liquid is applied onto the surface of the coated object relatively moved in a constant coat thickness. in a case where the shutter member is rotated to close the space between the coating liquid reservoir and the slit-shaped discharge port, with the pressure on the coating liquid stored in the coating liquid reservoir kept at the given level, the feeding of the coating liquid onto the surface of the coated object ends quickly.

Therefore, the following advantages are offered by the coating device of the invention when the coating liquid in the coating liquid reservoir is applied onto the surface of the coated object via the slit-shaped discharge port while effecting the relative movement between the coated object and the application nozzle. In the state where the pressure regulation means maintains the pressure on the coating liquid in the coating liquid reservoir to be at the given level as described above, the feeding of the coating liquid onto the surface of the coated object via the slit-shaped discharge port is quickly started or stopped simply by rotating the shutter member to open or close the space between the coating liquid reservoir and the slit-shaped discharge port. When the coating application is started, it does not take much time before the coating liquid forms a coat in uniform thickness. When the coating application is stopped, it does not take much time before the discharge of the coating liquid ends. The coating liquid can be easily applied onto the surface of the coated object without producing coat thickness variations, thus achieving uniformity in coat thickness.

BEST MODE FOR CARRYING OUT THE INVENTION

Figure 1:
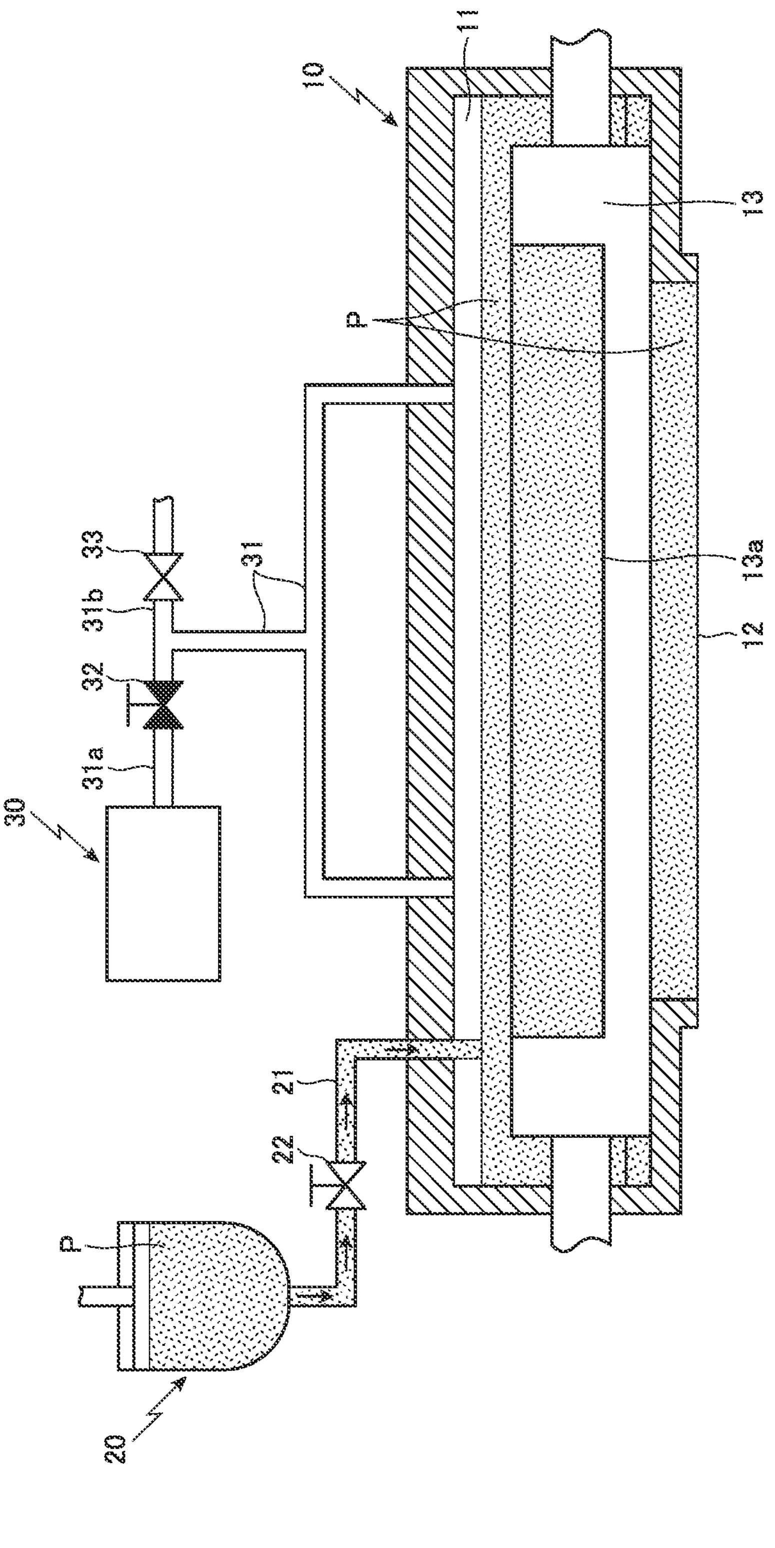
FIG. 1 is a schematic longitudinal sectional illustration of a coating device according to a first embodiment hereof, as seen in a longitudinal direction of a slit-shaped discharge port, showing how a coating liquid is fed from a coating liquid feed device into a coating liquid reservoir through a coating liquid feed pipe in a state where the slit-shaped discharge port at a distal end of the application nozzle is closed with a shutter member disposed in a coating liquid reservoir of an application nozzle.

A coating device according to the embodiment of the invention will hereinbelow be described with reference to the accompanying drawings. It is to be understood that the invention is not limited to the following embodiments but may include a variety of exemplary modifications so long as such modifications do not depart from the scope of the invention.

First Embodiment

As shown in FIG. 1 to FIG. 4D, a coating device according to a first embodiment hereof includes: an application nozzle 10 including a coating liquid reservoir 11 for storing a coating liquid P therein; a slit-shaped discharge port 12 disposed at a distal end of the application nozzle for discharging the coating liquid P stored in the above-described coating liquid reservoir 11; and a shutter member 13 rotatable in the coating liquid reservoir 11 so as to open or close space between the coating liquid reservoir 11 and the slit-shaped discharge port 12.

Used as the shutter member 13 is a bar-shaped body which is rotatable in the above-described coating liquid reservoir 11, and the outer periphery of which is formed with a guide notch 13*a* extended longer than the slit-shaped discharge port 12 in an axial direction thereof.

In a state where the guide notch 13*a* on the shutter member 13 is not brought to the position of the slit-shaped discharge port 12 by rotating the shutter member 13 in the coating liquid reservoir 11, the space between the coating liquid reservoir 11 and the slit-shaped discharge port is closed so that the coating liquid P stored in the coating liquid reservoir is not allowed to flow into the slit-shaped discharge port 12. In a state where the guide notch 13*a* is brought to the position of the slit-shaped discharge port 12, on the other hand, the coating liquid reservoir 11 is communicated with the slit-shaped discharge port 12 via the guide notch 13*a* so that the coating liquid P stored in the coating liquid reservoir 11 is allowed to flow to the slit-shaped discharge port 12 via the guide notch 13*a*.

In the coating device according to the first embodiment, a coating liquid feed valve 22 is disposed in a coating liquid feed pipe 21 for feeding the coating liquid P from a coating liquid feed device 20 to the coating liquid reservoir 11 in the application nozzle 10. A pressure is applied to the coating liquid P from above the coating liquid feed device 20 so as to open or close the coating liquid feed valve 22. By opening or closing the coating liquid feed valve 22, the coating liquid P is fed into the coating liquid reservoir 11 or the feeding of the coating liquid is stopped. On the other hand, a gas feed/exhaust pipe 31 is provided for feeding/exhausting the gas into/from the coating liquid reservoir 11. As a gas feed regulation means, a gas feed regulation valve 32 for regulating the gas fed from a gas feed device 30 to the coating liquid reservoir 11 is disposed in a feed side pipe 31*a* of the feed/exhaust pipe 31. Meanwhile, an exhaust valve 33 is disposed in an exhaust side pipe 31*b* of the feed/exhaust pipe 31 such that the gas in the coating liquid reservoir 11 is exhausted through the exhaust valve 33.

Figure 2:
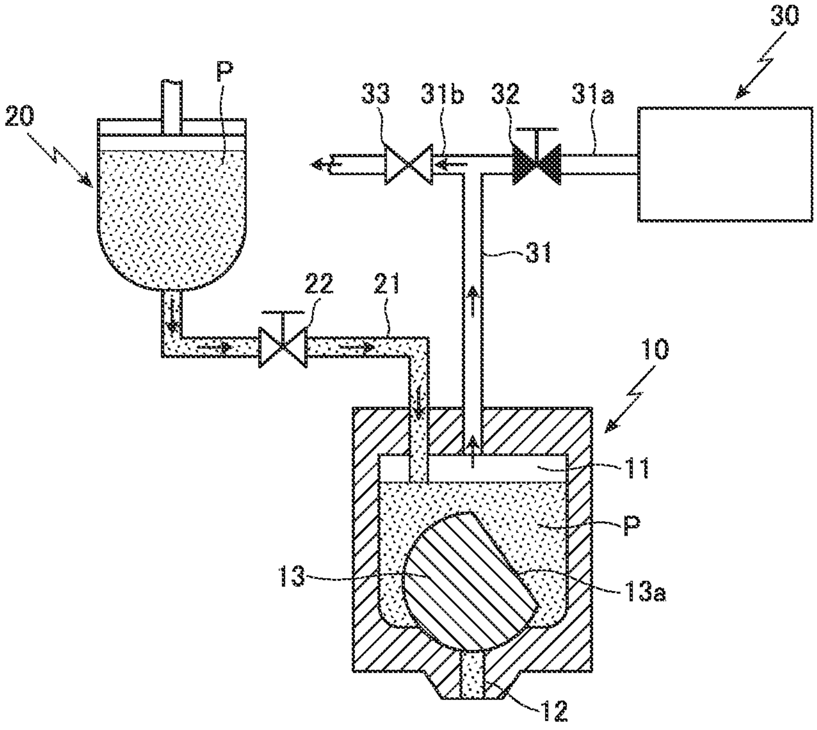
FIG. 2 is a schematic sectional illustration of the coating device according to the first embodiment as seen in a direction intersecting with the longitudinal direction of the slit-shaped discharge port, showing how the coating liquid is fed from the coating liquid feed device into the coating liquid reservoir through the coating liquid feed pipe in a state where the slit-shaped discharge port at the distal end of the application nozzle closed with the shutter member in the coating liquid reservoir of the application nozzle.

In a case where the coating liquid P is fed into the coating liquid reservoir 11 in the application nozzle 10 of the coating device according to the first embodiment, the coating liquid feed valve 22 in the coating liquid feed pipe 21 is opened in a state where the slit-shaped discharge port 12 at the distal end of the application nozzle 10 is closed by means of the shutter member 13, as shown in FIG. 1 and FIG. 2. The predetermined amount of coating liquid P is fed into the coating liquid reservoir 11 from the coating liquid feed device 20 through the coating liquid feed pipe 21. Meanwhile, the exhaust valve 33 disposed in the exhaust side pipe 31*b* is opened to exhaust the gas (gas purge) from the coating liquid reservoir 11 through the exhaust side pipe 31*b*. On the other hand, the gas feed regulation valve 32 disposed in the feed side pipe 31*a* is closed to inhibit the feeding of gas into the coating liquid reservoir 11 from the gas feed device 30. As to the open state and closed state of the coating liquid feed valve 22, the gas feed regulation valve 32 and the exhaust valve 33 shown in the figures, a blank mark indicates the open state, and a solid black mark indicates the closed state.

Figure 3:
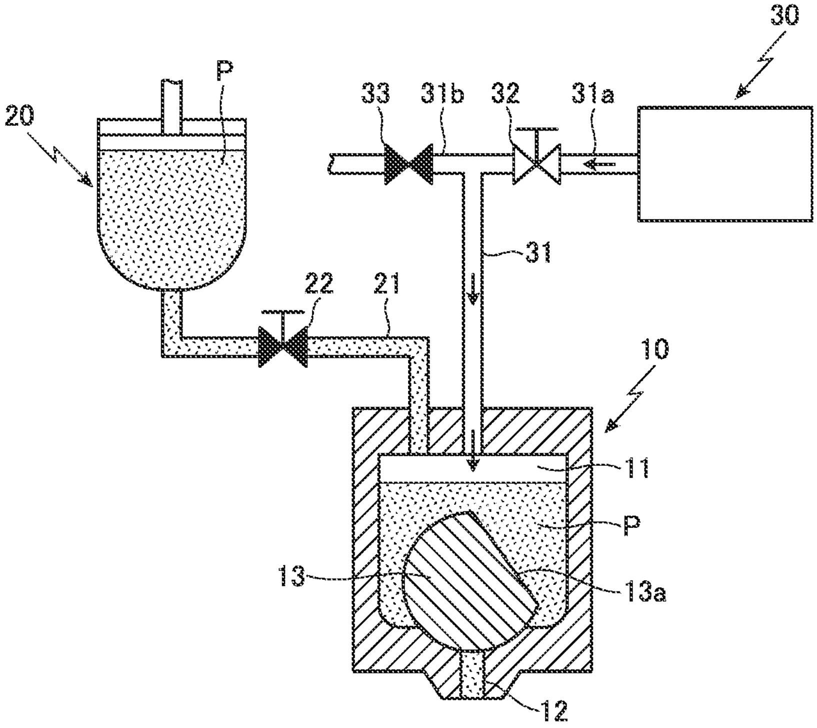
FIG. 3 is a schematic sectional illustration of the coating device according to the first embodiment as seen in the direction intersecting with the longitudinal direction of the slit-shaped discharge port, showing how pressure on the coating liquid in the coating liquid reservoir is regulated by feeding a gas into the coating liquid reservoir after the coating liquid is fed from the coating liquid feed device into the coating liquid reservoir through the coating liquid feed pipe.

After the predetermined amount of coating liquid P is fed into the coating liquid reservoir 11 in the application nozzle 10 as described above, the coating liquid feed valve 22 in the coating liquid feed pipe 21 is closed in the state where the slit-shaped discharge port 12 at the distal end of the application nozzle 10 is closed by the shutter member 13, as shown in FIG. 3. Thus, the feeding of the coating liquid P from the coating liquid feed device 20 into the coating liquid reservoir 11 is inhibited. Meanwhile, the exhaust valve 33 disposed in the exhaust side pipe 31*b* is closed to inhibit the exhaust of the gas from the coating liquid reservoir 11. On the other hand, the gas feed regulation valve 32 in the feed side pipe 31*a* is opened to feed the gas from the gas feed device to the coating liquid reservoir 11 via the gas feed regulation valve 32 disposed in the feed side pipe 31*a*. Thus, the pressure on the coating liquid P in the coating liquid reservoir 11 is controlled to be at a predetermined level.

Figure 4A:
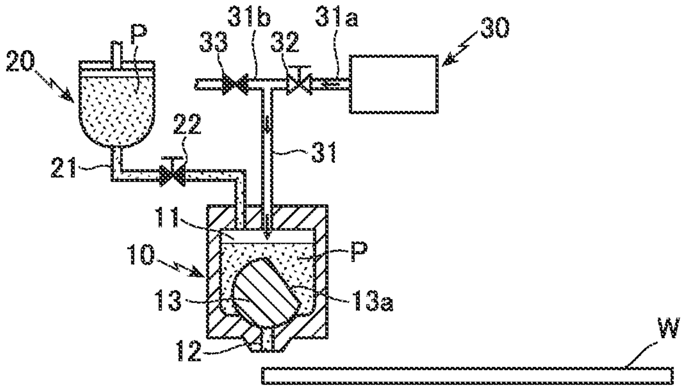
FIG. 4A illustrates the coating device according to the first embodiment and is a schematic sectional illustration of a part of a procedure which is performed in a state where the pressure on the coating liquid in the coating liquid reservoir fed with the predetermined amount of coating liquid is regulated by feeding a gas into the coating liquid reservoir, and which includes steps of: locating the application nozzle at place above the coated object; opening the space between the coating liquid reservoir and the slit-shaped discharge port by rotating the shutter member; feeding the coating liquid from the slit-shaped discharge port onto the coated object; and applying the coating liquid onto the surface of the coated object, the procedure performed in a manner that while the gas feed regulation means regulates the pressure on the coating liquid in the coating liquid reservoir to be at a predetermined level, the coated object is moved under the application nozzle which applies the coating liquid from the coating liquid reservoir onto the surface of the coated object via the slit-shaped discharge port.

In the coating device according to the first embodiment, the coating liquid P is applied to the surface of the coated object W through the application nozzle 10, as follows. The slit-shaped discharge port 12 at the distal end of the application nozzle 10 is closed with the shutter member 13. The gas is fed into the coating liquid reservoir 11 via the gas feed regulation valve 32 from the gas feed device 30, as described above. With the pressure on the coating liquid P in the coating liquid reservoir 11 regulated to be at the predetermined level, the application nozzle 10 is moved to position to start to apply the coating liquid P from the slit-shaped discharge port 12 onto the surface of the coated object W, as shown in FIG. 4A.

Figure 4B:
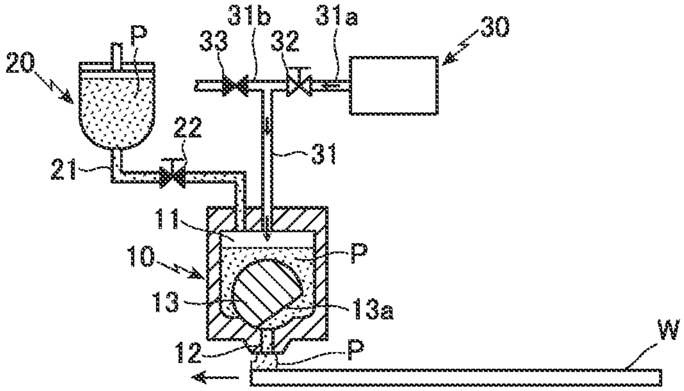
FIG. 4B illustrates the coating device according to the first embodiment and is a schematic sectional illustration of a part of the procedure which is performed in a state where the pressure on the coating liquid in the coating liquid reservoir fed with the predetermined amount of coating liquid is regulated by feeding a gas into the coating liquid reservoir, and which includes the steps of: locating the application nozzle at place above the coated object; opening the space between the coating liquid reservoir and the slit-shaped discharge port by rotating the shutter member; feeding the coating liquid from the slit-shaped discharge port onto the coated object; and applying the coating liquid onto the surface of the coated object, the procedure performed in a manner that while the gas feed regulation means regulates the pressure on the coating liquid in the coating liquid reservoir to be at a predetermined level, the coated object is moved under the application nozzle which applies the coating liquid from the coating liquid reservoir onto the surface of the coated object via the slit-shaped discharge port.

Next, as shown in FIG. 4B, the shutter member 13 is quickly rotated in the coating liquid reservoir 11 to transfer the guide notch 13*a* on the shutter member 13 to the position of the slit-shaped discharge port 12. The coating liquid reservoir 11 and the slit-shaped discharge port 12 are communicated with each other by means of the guide notch 13*a* so that the coating liquid stored in the coating liquid reservoir 11 is fed onto the surface of the coated object W under the predetermined pressure via a route from the guide notch 13*a* to the slit-shaped discharge port 12.

In this configuration, the shutter member 13 permits the coating liquid P to be quickly fed onto the surface of the coated object W via the slit-shaped discharge port 12. Unlike the prior art technique, this configuration prevents the coat thickness of the coating liquid P applied onto the surface of the coated object W from gradually increasing from the start of the coating application. It is ensured from the start of coating application that the coating liquid P is applied onto the whole surface of the coated object W in a manner to achieve the uniformity in coat thickness.

Figure 4C:
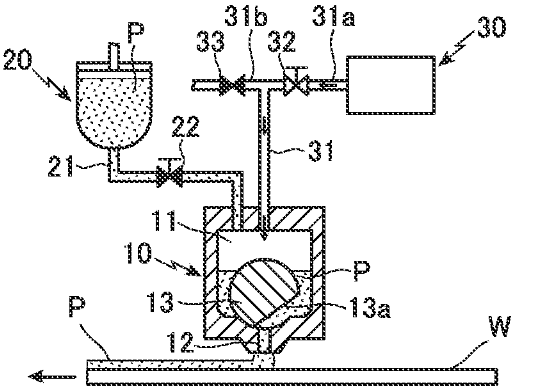
FIG. 4C illustrates the coating device according to the first embodiment and is a schematic sectional illustration of the part of a procedure which is performed in a state where the pressure on the coating liquid in the coating liquid reservoir fed with the predetermined amount of coating liquid is regulated by feeding a gas into the coating liquid reservoir, and which includes the steps of: locating the application nozzle at place above the coated object; opening the space between the coating liquid reservoir and the slit-shaped discharge port by rotating the shutter member; feeding the coating liquid from the slit-shaped discharge port onto the coated object; and applying the coating liquid onto the surface of the coated object, the procedure performed in a manner that while the gas feed regulation means regulates the pressure on the coating liquid in the coating liquid reservoir to be at a predetermined level, the coated object is moved under the application nozzle which applies the coating liquid from the coating liquid reservoir onto the surface of the coated object via the slit-shaped discharge port.

As shown in FIG. 4C, the amount of gas fed into the coating liquid reservoir 11 from the gas feed device 30 is regulated by means of the gas feed regulation valve 32 so that the pressure on the coating liquid P in the coating liquid reservoir 11 is controlled to be at the predetermined level. In this state, the coating liquid P is applied onto the surface of the coated object W by moving the coated object W under the application nozzle 10 (otherwise, moving the application nozzle 10 over the coated object W) while feeding the coating liquid P in the coating liquid reservoir 11 onto the surface of the coated object W through the discharge port 12 under the given pressure. This approach ensures that the coating liquid P is always fed onto the surface of the coated object W through the slit-shaped discharge port 12 under the given pressure. Hence, the coating liquid P is applied onto the surface of the coated object W in the uniform coat thickness.

Figure 4D:
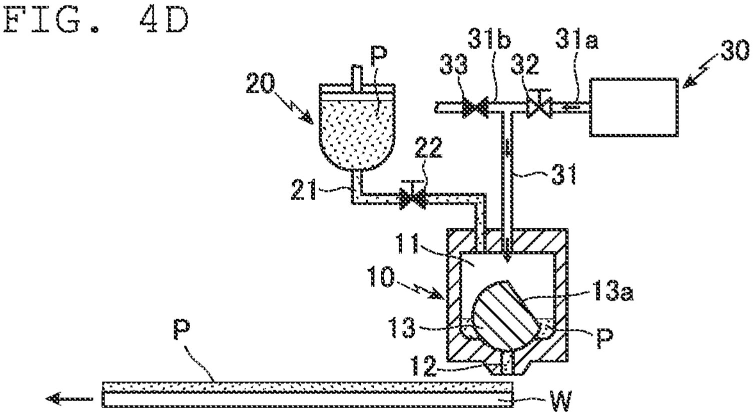
FIG. 4D illustrates the coating device according to the first embodiment and is a schematic sectional illustration of a part of the procedure which is performed in a state where the pressure on the coating liquid in the coating liquid reservoir fed with the predetermined amount of coating liquid is regulated by feeding a gas into the coating liquid reservoir, and which includes the steps of: locating the application nozzle at place above the coated object; opening the space between the coating liquid reservoir and the slit-shaped discharge port by rotating the shutter member; feeding the coating liquid from the slit-shaped discharge port onto the coated object; and applying the coating liquid onto the surface of the coated object, the procedure performed in a manner that while the gas feed regulation means regulates the pressure on the coating liquid in the coating liquid reservoir to be at a predetermined level, the coated object is moved under the application nozzle which applies the coating liquid from the coating liquid reservoir onto the surface of the coated object via the slit-shaped discharge port.

In a case where application of the coating liquid P onto the surface of the coated object W is stopped after the coating liquid P is applied onto the surface of the coated object W via the slit-shaped discharge port 12, the shutter member 13 is quickly rotated to move away the guide notch 13*a* on the shutter member 13 from the slit-shaped discharge port 12, as shown in FIG. 4D. Thus, the space between the coating liquid reservoir 11 and the slit-shaped discharge port 12 is closed with the shutter member 13 so as to inhibit the coating liquid P in the coating liquid reservoir 11 from flowing into the slit-shaped discharge port 12. In this configuration, the feeding of the coating liquid P onto the surface of the coated object W through the slit-shaped discharge port 12 under the given pressure is quickly stopped by the shutter member 13. Obviated is the problem encountered in the prior art that the coat thickness of the coating liquid P applied onto the surface of the coated object W is gradually decreased at the end of the coating operation. It is ensured that the coating liquid P is applied onto the whole surface of the coated object W in a manner to achieve the uniformity in coat thickness.

Second Embodiment

Just as the coating device of the first embodiment, a coating device according to a second embodiment hereof, as shown in FIG. 5A and FIG. 5B and FIG. 6A to FIG. 6D, includes: the coating liquid reservoir 11 for storing the coating liquid P in the application nozzle 10; the slit-shaped discharge port 12 disposed at the distal end of the application nozzle for discharging the coating liquid P stored in the coating liquid reservoir 11; and the shutter member 13 rotated in the coating liquid reservoir 11 so as to open or close space between the coating liquid reservoir 11 and the slit-shaped discharge port 12.

Just as in the coating device of the first embodiment, the coating device of the second embodiment is configured such that in a state where the guide notch 13*a* on the shutter member 13 is not transferred to the position of the slit-shaped discharge port 12 by rotating the shutter member 13 in the coating liquid reservoir 11, the space between the coating liquid reservoir 11 and the slit-shaped discharge port 12 is closed with the shutter member 13 so that the coating liquid P in the coating liquid reservoir 11 is not allowed to flow to the slit-shaped discharge port 12. On the other hand, in a state where the guide notch 13*a* is transferred to the position of the slit-shaped discharge port 12, the coating liquid reservoir 11 and the slit-shaped discharge port 12 are communicated with each other via the guide notch 13*a*. Thus, the coating liquid P stored in the coating liquid reservoir 11 is allowed to flow into the slit-shaped discharge port 12 via the guide notch 13*a*.

In the coating device according to the second embodiment, as well, the coating liquid P is fed into the coating liquid reservoir 11 in the application nozzle 10 in the same way as in the above-described coating device of the first embodiment. That is, the coating liquid P is fed from the unillustrated coating liquid feed device to the coating liquid reservoir 11 in the application nozzle 10 through the coating liquid feed pipe 21.

In the coating device according to the second embodiment, the coating liquid P is fed from the coating liquid feed device 20 to the coating liquid reservoir 11 in the application nozzle 10 via the coating liquid feed pipe 21, as follows. As shown in FIG. 5A and FIG. 5B and FIG. 6A to FIG. 6D, a syringe pump 40 as a coating liquid feed regulation means for regulating the feeding of the coating liquid P to maintain the pressure on the coating liquid P in the coating liquid reservoir 11 at a given level is disposed at some midpoint of the above-described coating liquid feed pipe 21. The coating liquid P is allowed to flow into the syringe pump 40 through a first coating liquid feed valve 22*a* disposed in the coating liquid feed pipe 21 on an upstream side of the syringe pump 40. The coating liquid P flows into the syringe pump 40 and is fed into and filled in the coating liquid reservoir 11 through a second coating liquid feed valve 22*b* disposed in the coating liquid feed pipe 21 on a downstream side of the syringe pump 40.

In the coating device according to the second embodiment, an exhaust valve 35 is disposed in an exhaust pipe 34 for exhausting the gas in the coating liquid reservoir 11 to the outside in a case where the coating liquid P is fed into the coating liquid reservoir 11.

Figure 5A:
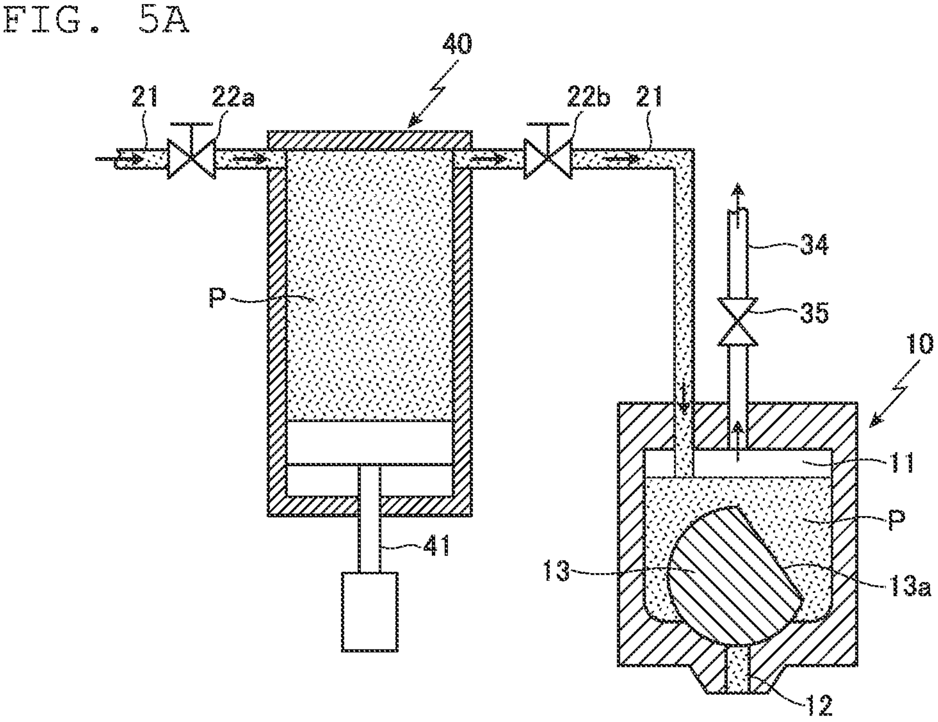
FIG. 5A illustrates a coating device according to a second embodiment hereof and is a schematic sectional illustration as seen in a direction intersecting with the longitudinal direction of the slit-shaped discharge port, showing how the coating liquid is fed from the coating liquid feed device into the coating liquid reservoir via the coating liquid feed pipe in a state where the slit-shaped discharge port at the distal end of the application nozzle is closed with the shutter member disposed in the coating liquid reservoir in the application nozzle.

In the coating device according to the second embodiment, the coating liquid P is fed into the coating liquid reservoir 11 in the application nozzle 10 as follows. In a state where the slit-shaped discharge port 12 at the distal end of the application nozzle 10 is closed with the shutter member 13, as shown in FIG. 5A, the first coating liquid feed valve 22*a* and the second coating liquid feed valve 22*b* disposed in the coating liquid feed pipe 21 are opened so as to feed the coating liquid P into the syringe pump 40 through the coating liquid feed pipe 21 and to fill the coating liquid therein. The coating liquid P in the syringe pump 40 is fed into the coating liquid reservoir 11 of the application nozzle 10. On the other hand, the exhaust valve 35 disposed in the exhaust pipe 34 is opened to exhaust the gas from the coating liquid reservoir 11 (gas purge) through the exhaust pipe 34.

Figure 5B:
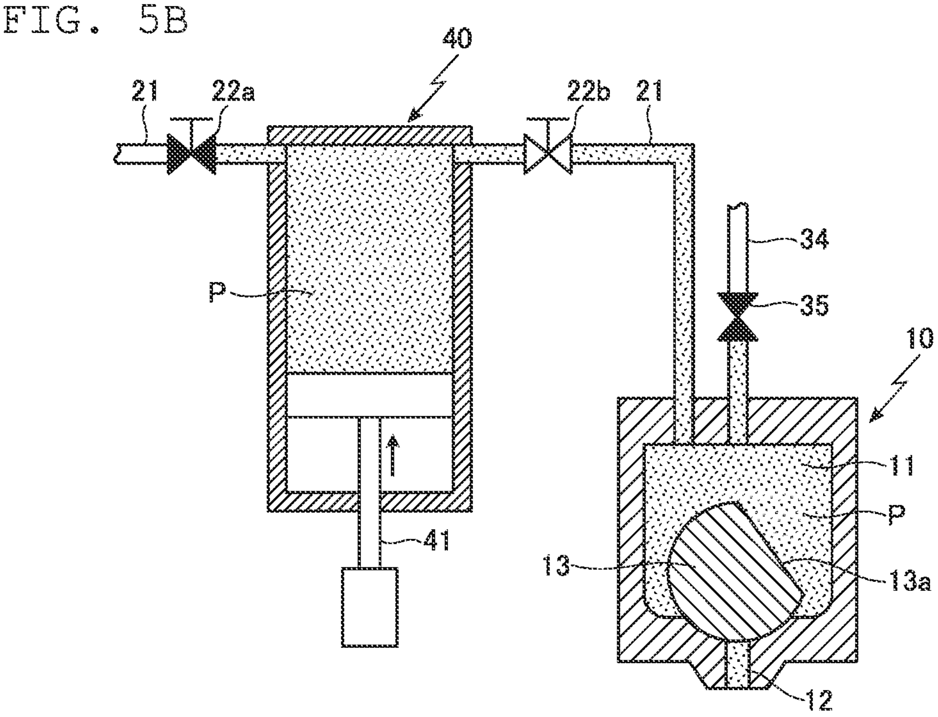
FIG. 5B illustrates a coating device according to the second embodiment hereof and is a schematic sectional illustration as seen in a direction intersecting with the longitudinal direction of the slit-shaped discharge port, showing how the feeding of the coating liquid is regulated to ensure that the pressure on the coating liquid stored in the coating liquid reservoir is at the given level in a state where the coating liquid is filled in the coating liquid reservoir.

After the coating liquid P is filled in the coating liquid reservoir 11 by feeding the coating liquid P into the coating liquid reservoir 11 of the application nozzle 10, the first coating liquid feed valve 22*a* and the exhaust valve 35 are in closed position as shown in FIG. 5B. In this state, the coating liquid P in the syringe pump 40 is pushed by the cylinder 41 in the syringe pump 40 in a direction to deliver the coating liquid P in the syringe pump into the coating liquid reservoir 11 so as to control the pressure on the coating liquid P in the coating liquid reservoir 11 to be at the predetermined level. As to the open state and closed state of the first coating liquid feed valve 22*a*, the second coating liquid feed valve 22*b*, and the exhaust valve 35 shown in the figures, the blank mark indicates the open state, and the solid black mark indicates the closed state.

Figure 6A:
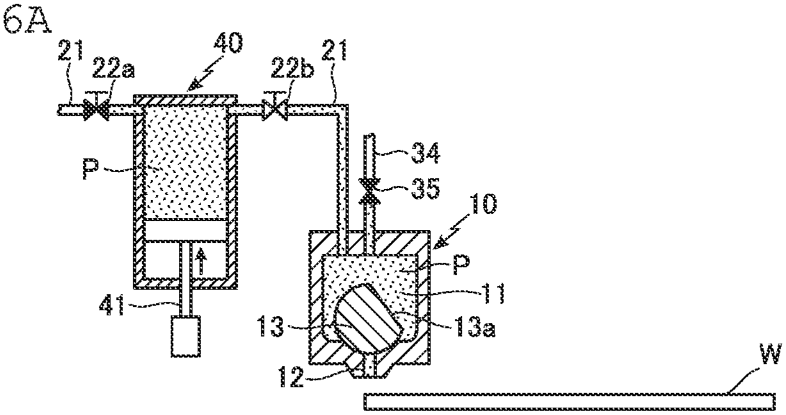
FIG. 6A illustrates the coating device according to the second embodiment and is a schematic sectional illustration of a part of a procedure which is performed in a state where the coating liquid is filled in the coating liquid reservoir and the pressure on the coating liquid filled in the coating liquid reservoir is so regulated as to be at the given level and which includes steps of: locating the application nozzle at place above the coated object; moving the coated object under the application nozzle while regulating the pressure on the coating liquid in the coating liquid reservoir to be at the given level; and applying the coating liquid in the coating liquid reservoir onto the surface of the coated object via the slit-shaped discharge port.

In the coating device according to the second embodiment, the application nozzle 10 applies the coating liquid P onto the surface of the coated object W, as follows. The slit-shaped discharge port 12 at the distal end of the application nozzle 10 is closed with the shutter member 13, as described above. The coating liquid P in the syringe pump 40 is pushed by the cylinder 41 of the syringe pump 40 in the direction to deliver the coating liquid P into the coating liquid reservoir 11 so that the pressure on the coating liquid P in the coating liquid reservoir 11 is controlled to be at the predetermined level. In this state, as shown in FIG. 6A, this application nozzle 10 is moved to the position to start the application of the coating liquid P onto the surface of the coated object W through the slit-shaped discharge port 12.

Figure 6B:
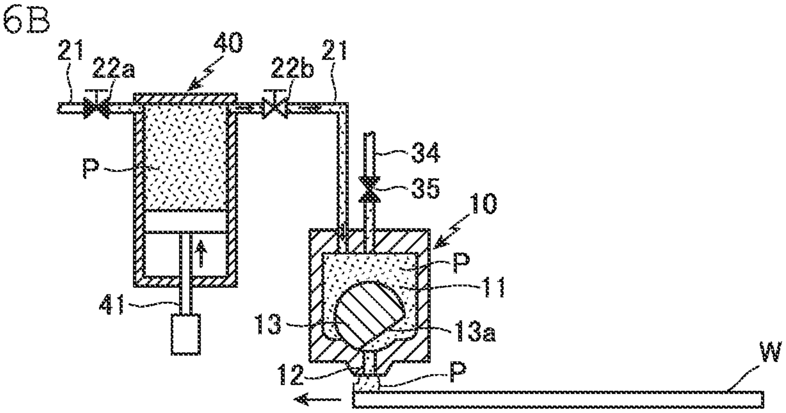
FIG. 6B illustrates the coating device according to the second embodiment and is a schematic sectional illustration of a part of the procedure which is performed in a state where the coating liquid is filled in the coating liquid reservoir and the pressure on the coating liquid filled in the coating liquid reservoir is so regulated as to be at the given level and which includes the steps of: locating the application nozzle at place above the coated object; moving the coated object under the application nozzle while regulating the pressure on the coating liquid in the coating liquid reservoir to be at the given level; and applying the coating liquid in the coating liquid reservoir onto the surface of the coated object via the slit-shaped discharge port.

Subsequently, as shown in FIG. 6B, the shutter member 13 is quickly rotated in the coating liquid reservoir 11 so as to bring the guide notch 13*a* on the shutter member 13 to the position of the slit-shaped discharge port 12. Thus, the coating liquid reservoir 11 and the slit-shaped discharge port 12 are communicated with each other by means of the guide notch 13*a*. The coating liquid P stored in the coating liquid reservoir 11 is fed onto the surface of the coated object W under the predetermined pressure via route from the guide notch 13*a* to the slit-shaped discharge port 12.

This configuration permits the shutter member 13 to quickly feed the coating liquid P onto the surface of the coated object W through the slit-shaped discharge port 12. Unlike the prior art technique, this configuration prevents the coat thickness of the coating liquid P applied onto the surface of the coated object W from being gradually increased from the start of the coating ensures application. The configuration ensures that from the start of coating application, the coating liquid P is applied onto the whole surface of the coated object W in a manner to achieve the uniformity in coat thickness.

Figure 6C:
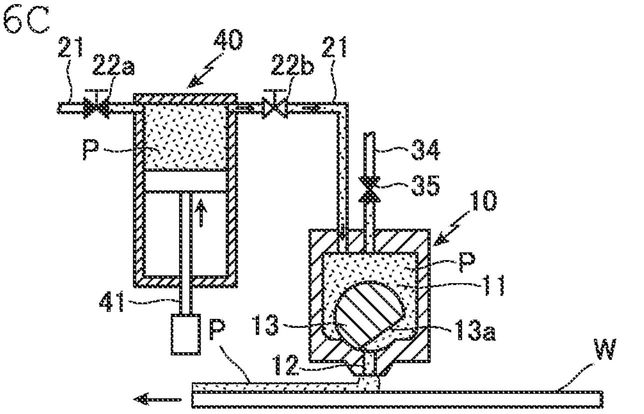
FIG. 6C illustrates the coating device according to the second embodiment and is a schematic sectional illustration of a part of the procedure which is performed in a state where the coating liquid is filled in the coating liquid reservoir and the pressure on the coating liquid filled in the coating liquid reservoir is so regulated as to be at the given level and which includes the steps of: locating the application nozzle at place above the coated object; moving the coated object under the application nozzle while regulating the pressure on the coating liquid in the coating liquid reservoir to be at the given level; and applying the coating liquid in the coating liquid reservoir onto the surface of the coated object via the slit-shaped discharge port.

As shown in FIG. 6C, the coating liquid P in the syringe pump 40 is pushed by the cylinder 41 in the direction to deliver the coating liquid into the coating liquid reservoir 11 so that the pressure on the coating liquid in the coating liquid reservoir 11 is controlled to be at the predetermined level. In this state, the coated object W is moved under the application nozzle (Otherwise, the application nozzle 10 is moved over the coated object W) while feeding the coating liquid P in the coating liquid reservoir 11 onto the surface of the coated object W through the slit-shaped discharge port 12 under the predetermined pressure. This approach ensures that the coating liquid P is fed onto the surface of the coated object W through the slit-shaped discharge port 12 under the given pressure so that the coating liquid P is applied onto the surface of the coated object W in a manner to achieve the uniformity in coat thickness.

Figure 6D:
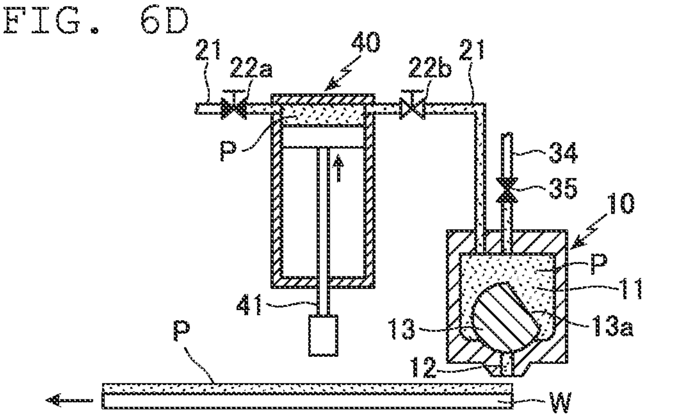
FIG. 6D illustrates the coating device according to the second embodiment and is a schematic sectional illustration of a part of the procedure which is performed in a state where the coating liquid is filled in the coating liquid reservoir and the pressure on the coating liquid filled in the coating liquid reservoir is so regulated as to be at the given level and which includes the steps of: locating the application nozzle at place above the coated object; moving the coated object under the application nozzle while regulating the pressure on the coating liquid in the coating liquid reservoir to be at the given level; and applying the coating liquid in the coating liquid reservoir onto the surface of the coated object via the slit-shaped discharge port.

When the application of the coating liquid P onto the surface of the coated object W is ended after the coating liquid P is applied onto the surface of the coated object W through the slit-shaped discharge port 12, the following procedure is taken. As shown in FIG. 6D, the shutter member 13 is quickly rotated to move away the guide notch 13*a* on the shutter member 13 from the position of the slit-shaped discharge port 12. Thus, the space between the coating liquid reservoir 11 and the slit-shaped discharge port 12 is closed with the shutter member 13 so that the coating liquid P stored in the coating liquid reservoir 11 is inhibited from flowing into the slit-shaped discharge port 12. In this approach, the feeding of the coating liquid P onto the surface of the coated object W through the slit-shaped discharge port 12 under the given pressure is quickly stopped by the shutter member 13. Unlike the prior art technique, this configuration prevents a gradual decrease of the coat thickness of the coating liquid P applied onto the surface of the coated object W at the end of the coating application. The configuration ensures that the coating liquid P is applied onto the whole surface of the coated object W in a manner to achieve the uniformity in coat thickness.

In a case where the amount of the coating liquid P in the syringe pump 40 is decreased, the following procedure is taken, the illustration of which is not provided. The second coating liquid feed valve 22*b* is closed. Meanwhile, the first coating liquid feed valve 22*a* is opened. The cylinder 41 in the syringe pump 40 is moved in a suction direction to fill again the syringe pump 40 with the coating liquid P delivered from the coating liquid feed device 20 through the coating liquid feed pipe 21. According to the illustration of the embodiment, the coating liquid P in the syringe pump 40 runs out in one cycle of application operation. However, the syringe pump 40 can also be filled with a larger amount of coating liquid P so as to be adapted for a plural number of cycles of coating operations. Subsequently, the coating liquid P is fed from the coating liquid feed device 20 through the coating liquid feed pipe 21 so as to be filled in the syringe pump 40.

It is to be understood that the shutter member 13 used in the invention is not limited to that used in the above-described embodiments 1 and 2. The shape of the guide notch 13*a* formed on the above-described shutter member 13 can be varied in various shapes as shown in the development views of the shutter member 13 as shown in FIG. 7A to FIG. 7D.

Figure 7A:
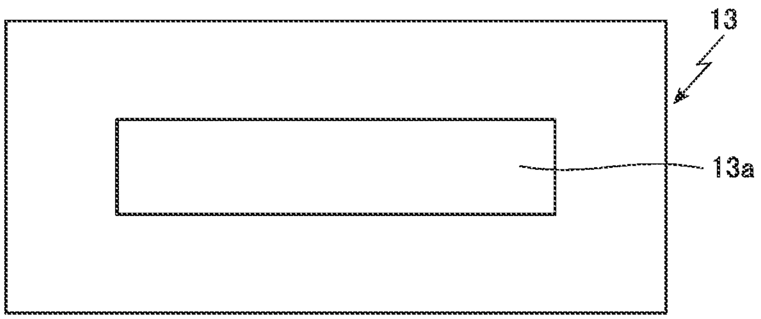
FIG. 7A illustrates the coating device according to the embodiment which includes a shutter member formed with a guide notch, and is a schematic developed view showing one of guide notches varied in shape.
Figure 8A:
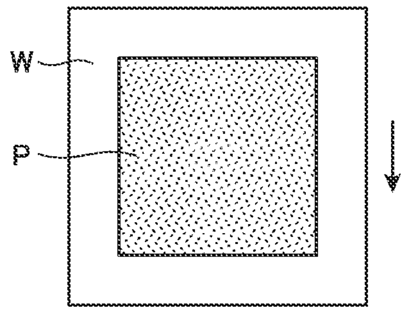
FIG. 8A shows the coating device according to the embodiment, illustrating one of examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.
Figure 8B:
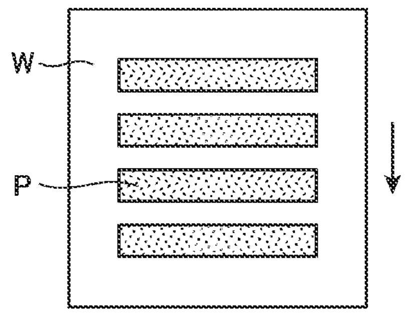
FIG. 8B shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.

By using a shutter member 13 formed with a large square guide notch 13*a* as seen in planar view of FIG. 7A, for example, the coating liquid P is applied onto the surface of the coated object W while effecting the relative movement between the coated object W and the application nozzle 10. In this operation, the shutter member 13 is opened for a predetermined length of time so as to continuously feed the coating liquid P from the above-described guide notch 13*a* onto the surface of the coated object W. As shown in FIG. 8A, the coating liquid is applied in a square shape onto the surface of the coated object W. Alternatively, the shutter member 13 is intermittently opened and closed so as to intermittently feed the coating liquid P from the guide notch 13*a* onto the surface of the coated object W. As shown in FIG. 8B, the coating liquid P is applied onto the surface of the coated object W in the shape of plural reeds elongated in an axial direction of the shutter member 13.

Figure 7B:
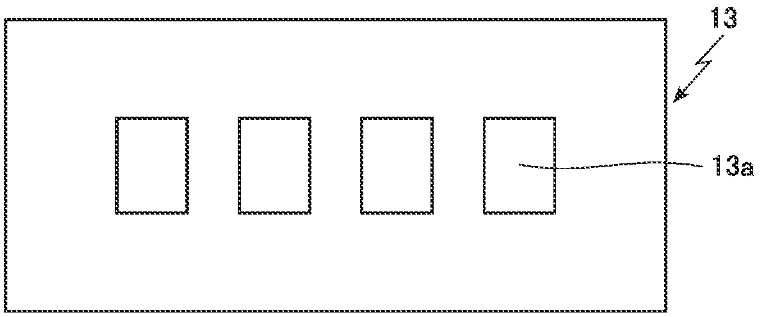
FIG. 7B illustrates the coating device according to the embodiment which includes the shutter member formed with the guide notch, and is a schematic developed view showing one of the guide notches varied in shape.
Figure 8C:
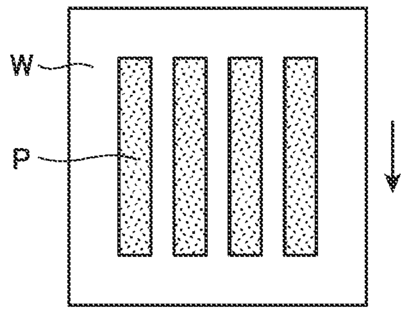
FIG. 8C shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.
Figure 8D:
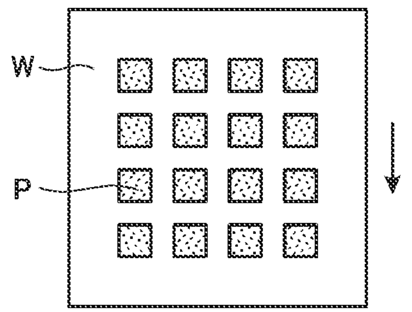
FIG. 8D shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.

As shown in FIG. 7B, the shutter member 13 formed with a plurality of square guide notches 13*a* axially arranged at required space intervals is used. When applying the coating liquid P onto the surface of the coated object W while effecting the relative movement between the coated object W and the application nozzle 10, the shutter member 13 is opened for a predetermined length of time. As shown in FIG. 8C, the coating liquid P is continuously applied from the guide notches 13*a* onto the surface of the coated object in the form of plural stripe lines. Further, the shutter member is intermittently opened and closed so that the coating liquid P is intermittently fed from the individual guide notches 13*a* onto the surface of the coated object W. As shown in FIG. 8D, the coating liquid is applied in the form of squares arranged in a grid pattern.

Figure 7C:
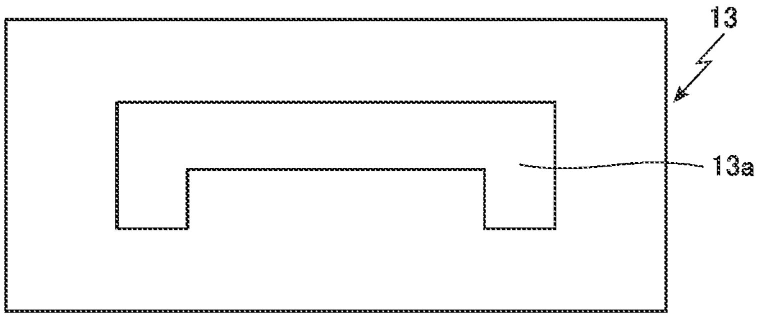
FIG. 7C illustrates the coating device according to the embodiment which includes the shutter member formed with the guide notch, and is a schematic developed view showing one of the guide notches varied in shape.
Figure 8E:
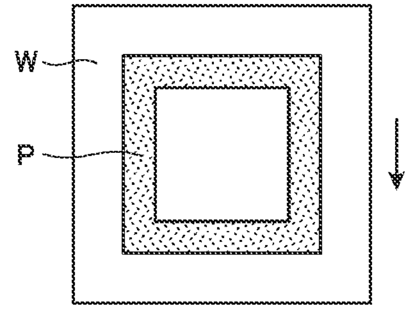
FIG. 8E shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.
Figure 8F:
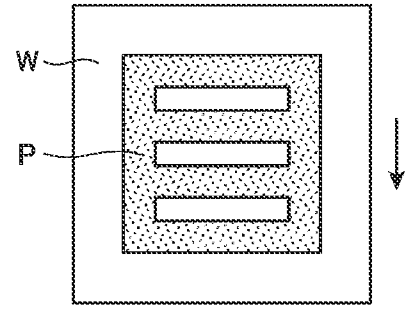
FIG. 8F shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.

When the shutter member 13 formed with a concave guide notch 13*c* is used as shown in FIG. 7C and the coating liquid P is applied onto the surface of the coated object W while effecting the relative movement between the coated object W and the application nozzle 10, the shutter member 13 is opened and closed in proper timings so that the coating liquid P is applied onto the surface of the coated object W in a pattern of a frame as shown in FIG. 8E. Alternatively, as shown in FIG. 8F, the coating liquid P can be applied onto the surface of the coated object W in a pattern of a frame in which horizontal stripes are formed.

Figure 7D:
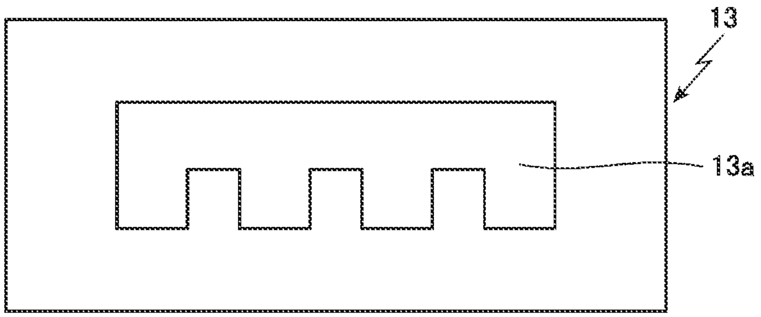
FIG. 7D illustrates the coating device according to the embodiment which includes the shutter member formed with the guide notch, and is a schematic developed view showing one of the guide notches varied in shape.
Figure 8G:
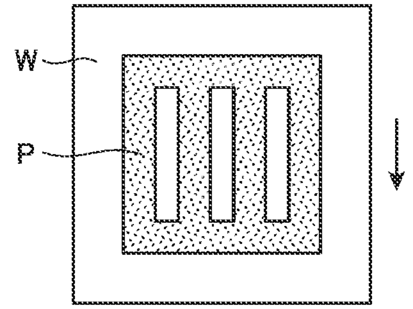
FIG. 8G shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.
Figure 8H:
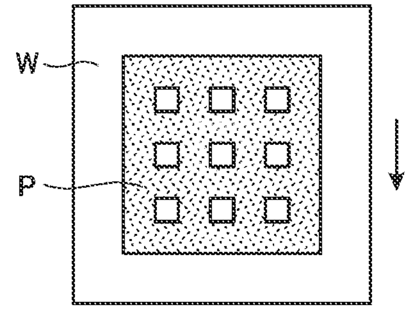
FIG. 8H shows the coating device according to the embodiment, illustrating one of the examples of the application of the coating liquid onto the coated object by using the shutter member varied in the shape of the guide notch as shown in FIG. 7A to FIG. 7D, and is a schematic plan view showing how the coating liquid is applied onto the coated object by controlling the rotation of the shutter member.

Further, when the shutter member 13 formed with a pectinated guide notch 13*a* is used as shown in FIG. 7D, and the coating liquid P is applied onto the surface of the coated object W while effecting the relative movement between the coated object W and the application nozzle 10, the shutter member 13 is opened and closed in proper timings so that the coating liquid P is applied onto the surface of the coated object W in a pattern of a frame formed with vertical stripes as shown in FIG. 8G. Otherwise, as shown in FIG. 8H, the coating liquid is intermittently fed onto the surface of the coated object W through the pectinated guide notch 13*a*, so that the coating liquid P can be applied onto the surface of the coated object W in a pattern where a plurality of non-coated square portions are arranged in a grid pattern.

REFERENCE SIGNS LIST

10: application nozzle
11: coating liquid reservoir
12: slit-shaped discharge port
13: shutter member
13*a*: guide notch
20: coating liquid feed device
21: coating liquid feed pipe
22: coating liquid feed valve
22*a*: first coating liquid feed valve
22*b*: second coating liquid feed valve
30: gas feed device
31: feed/exhaust pipe
31*a*: feed side pipe
31*b*: exhaust side pipe
32: gas feed regulation valve
33: exhaust valve
34: exhaust pipe
35: exhaust valve
40: syringe pump
41: cylinder
P: coating liquid
W: coated object

What is claimed is:

1. A coating device comprising a coating liquid feed device, a coating liquid reservoir in an application nozzle, and a slit-shaped discharge port, which feeds a coating liquid from the coating liquid feed device into the coating liquid reservoir in the application nozzle via a coating liquid feed pipe;

which locates the slit-shaped discharge port at a place above a coated object, the slit-shaped discharge port disposed at a distal end of the application nozzle for discharging the coating liquid from the coating liquid reservoir; and which applies the coating liquid in the coating liquid reservoir onto a surface of the coated object through the slit-shaped discharge port while effecting a relative movement between the coated object and the application nozzle, wherein the coating device further comprises a shutter member rotatable around an axis thereof defining an axial direction in the coating liquid reservoir and configured to open and close a space-between the coating liquid reservoir and the slit-shaped discharge port by rotation thereof, a gas feed regulation means as a pressure regulation means for regulating the pressure on the coating liquid in the coating liquid reservoir, the gas feed regulation means, with the coating liquid fed into the coating liquid reservoir, feeding a gas into the coating liquid reservoir to regulate the pressure on the coating liquid in the coating liquid reservoir to be at a given level, with the pressure on the coating liquid in the coating liquid reservoir maintained to be at the given level by the gas feed regulation means, the shutter member is rotated to open and close the space between the coating liquid reservoir and the slit-shaped discharge port, the shutter member includes a columnar body extending along the axial direction, and a guide notch formed on an outer periphery of the columnar body and having an axial length of the guide notch greater than a length of the slit-shaped discharge port measured in the axial direction, and the shutter member is configured to rotate to bring the guide notch to a position corresponding to the slit-shaped discharge port, thereby establishing communication between the coating liquid reservoir and the slit-shaped discharge port and allowing the coating liquid in the coating liquid reservoir to flow through the guide notch to the slit-shaped discharge port so that the coating liquid is applied onto the surface of the coated object.

* * * * *